United States Patent
Choi et al.

(10) Patent No.: US 10,464,263 B2
(45) Date of Patent: Nov. 5, 2019

(54) HEAT WELDING APPARATUS FOR COMBINING PLASTIC FUEL TANK AND PLASTIC PARTS AND METHOD OF COMBINING PLASTIC FUEL TANK AND PLASTIC PARTS USING THE APPARATUS

(71) Applicant: DONG HEE INDUSTRIAL CO., LTD., Ulsan (KR)

(72) Inventors: Nan Woong Choi, Asan-si (KR); Se Jun Kim, Asan-si (KR); Seung Ho Lee, Asan-si (KR); Myeong Hoon Baek, Cheonan-si (KR)

(73) Assignee: Dong Hee Industrial Co., Ltd., Ulsan (KR)

( * ) Notice: Subject to any disclaimer, the term of this patent is extended or adjusted under 35 U.S.C. 154(b) by 102 days.

(21) Appl. No.: 15/874,475

(22) Filed: Jan. 18, 2018

(65) Prior Publication Data

US 2019/0016062 A1   Jan. 17, 2019

(30) Foreign Application Priority Data

Jul. 17, 2017   (KR) .......................... 10-2017-0090138

(51) Int. Cl.
*B29C 65/00* (2006.01)
*B29C 65/14* (2006.01)
(Continued)

(52) U.S. Cl.
CPC ........ *B29C 66/532* (2013.01); *B29C 65/1412* (2013.01); *B29C 65/1432* (2013.01);
(Continued)

(58) Field of Classification Search
CPC . B29C 66/532; B29C 66/61; B29C 66/73921; B29C 66/863; B29C 66/9221;
(Continued)

(56) References Cited

U.S. PATENT DOCUMENTS 5,035,045 A * 7/1991 Bowen ................ B29C 65/1412
156/273.3
8,256,480 B1 * 9/2012 Weber .................. B25J 15/0019
156/359
(Continued)

FOREIGN PATENT DOCUMENTS

CN  103640209 A   3/2014
EP    1834755 A1   9/2007
(Continued)

OTHER PUBLICATIONS

Machine Translation of JP-2003011229-A (Year: 2003).*
(Continued)

*Primary Examiner* — Daniel McNally
(74) *Attorney, Agent, or Firm* — Knobbe Martens Olson & Bear LLP

(57) ABSTRACT

Disclosed is a heat welding apparatus for combining a plastic fuel tank and plastic parts, and a method of combining the plastic fuel tank and the plastic parts using the apparatus. When a plastic part is heat-welded onto an inner surface of the plastic fuel tank, a melting unit simultaneously heats and melts a welding portion of the inner surface of the plastic fuel tank, to which the plastic part is joined, and a welding surface of the plastic part inside the plastic fuel tank, and then the welding surface of the plastic part is heat-welded to the welding portion of the plastic fuel tank after melting without delay.

11 Claims, 9 Drawing Sheets

(51) Int. Cl.
*B29C 65/78* (2006.01)
*B60K 15/03* (2006.01)
*B29L 31/00* (2006.01)

(52) U.S. Cl.
CPC ...... *B29C 65/1467* (2013.01); *B29C 65/7838* (2013.01); *B29C 65/7841* (2013.01); *B29C 66/61* (2013.01); *B29C 66/73921* (2013.01); *B29C 66/863* (2013.01); *B29C 66/9221* (2013.01); *B29C 66/9241* (2013.01); *B29C 66/961* (2013.01); *B60K 15/03177* (2013.01); *B29C 66/8242* (2013.01); *B29L 2031/7172* (2013.01); *B60K 2015/03032* (2013.01); *B60K 2015/0346* (2013.01); *B60K 2015/03493* (2013.01)

(58) Field of Classification Search
CPC .............. B29C 66/9241; B29C 66/961; B29C 65/1412; B29C 65/1432; B29C 65/1467; B29C 65/7838; B29C 65/7841; B60K 15/03177
See application file for complete search history.

(56) References Cited

U.S. PATENT DOCUMENTS

| | | | |
|---|---|---|---|
| 2001/0006170 A1 | 7/2001 | Moench | |
| 2005/0127078 A1* | 6/2005 | Vorenkamp | B29C 66/61 220/562 |
| 2007/0181571 A1 | 8/2007 | Prevost et al. | |
| 2012/0205049 A1 | 8/2012 | Weber et al. | |

FOREIGN PATENT DOCUMENTS

| | | | | |
|---|---|---|---|---|
| JP | 2002-355890 A | | 12/2002 | |
| JP | 2003-011229 A | | 1/2003 | |
| JP | 2003011229 A | * | 1/2003 | ....... B29C 66/53247 |
| JP | 2004-505797 A | | 2/2004 | |
| JP | 2004-276485 A | | 10/2004 | |
| JP | 2007-176016 A | | 7/2007 | |
| JP | 2015-139912 A | | 8/2015 | |
| JP | 2016-141055 A | | 8/2016 | |
| KR | 10-2007-0012642 A | | 1/2007 | |
| KR | 10-2009-0060809 A | | 6/2009 | |
| KR | 10-1690027 B1 | | 12/2016 | |
| KR | 10-2017-0072971 A | | 6/2017 | |

OTHER PUBLICATIONS

Notice of Allowance of corresponding Korean Patent Application No. 10-2017-0090138—4 pages (dated Jan. 3, 2019).
Extended European Search Report of corresponding Patent Application No. 18275002.6—10 pages (dated Aug. 8, 2018).

* cited by examiner

[FIG. 1]
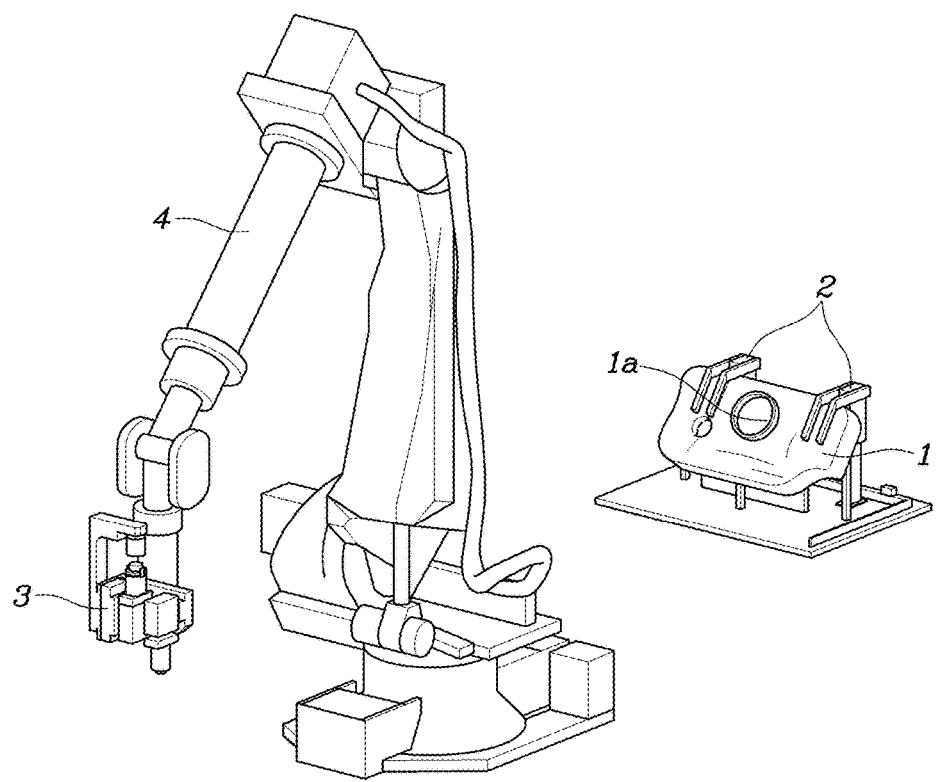

[FIG. 2]
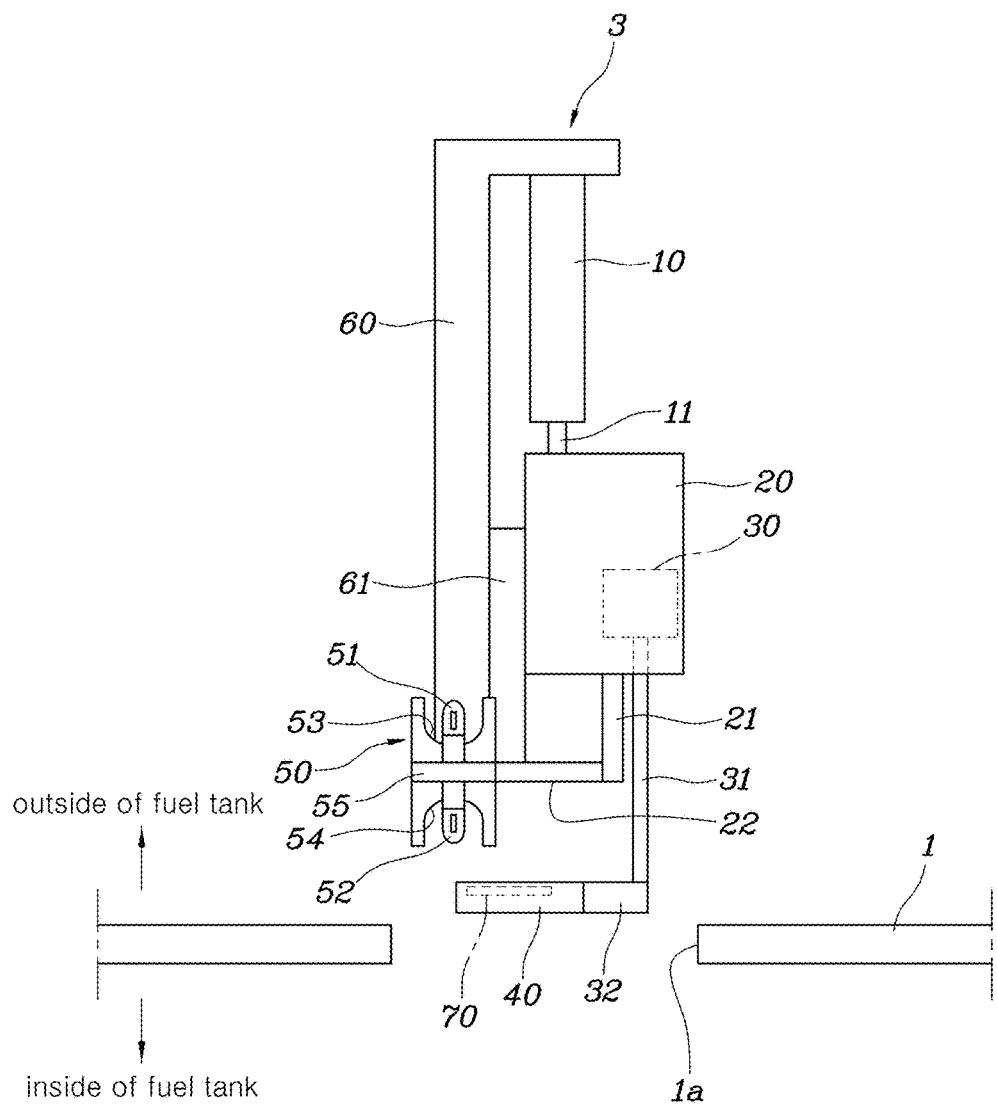

[FIG. 3]
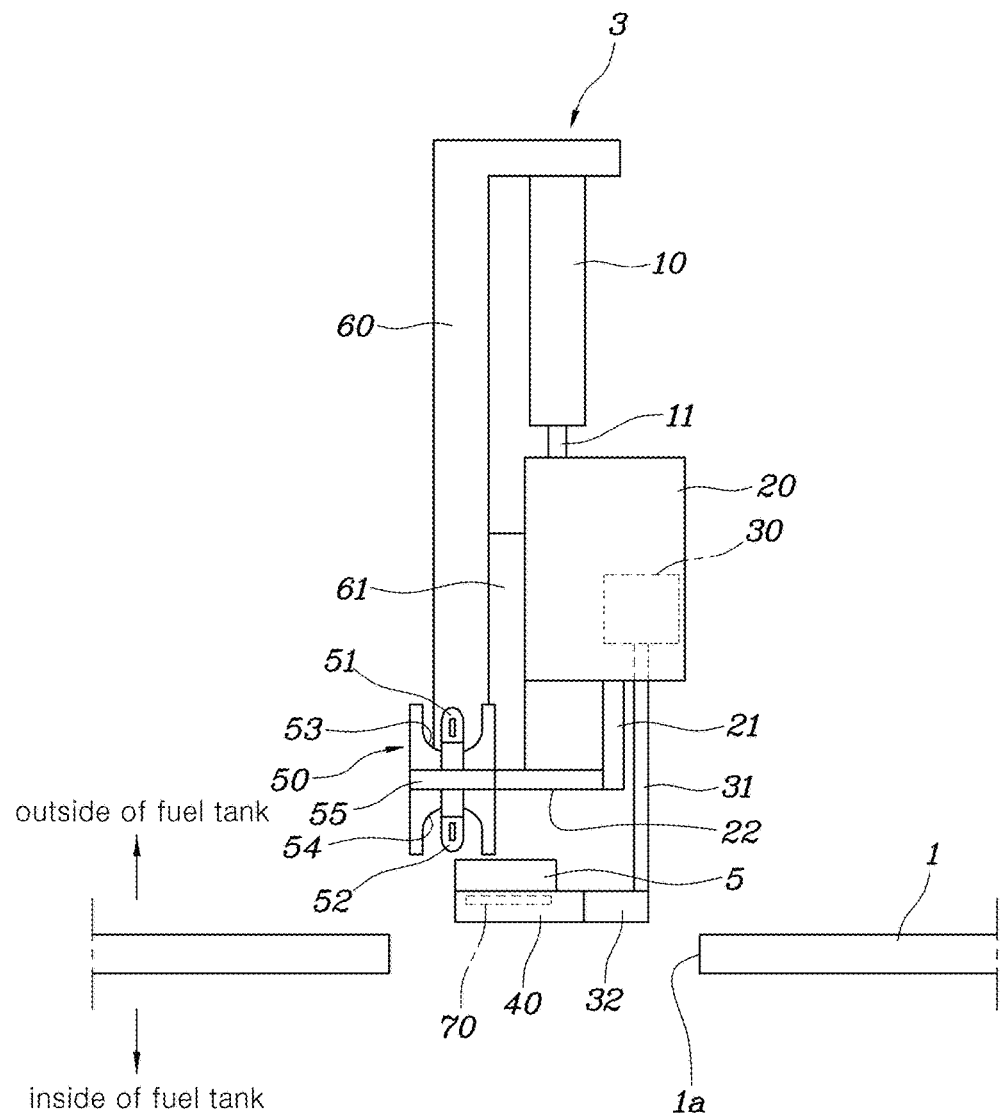

[FIG. 4]
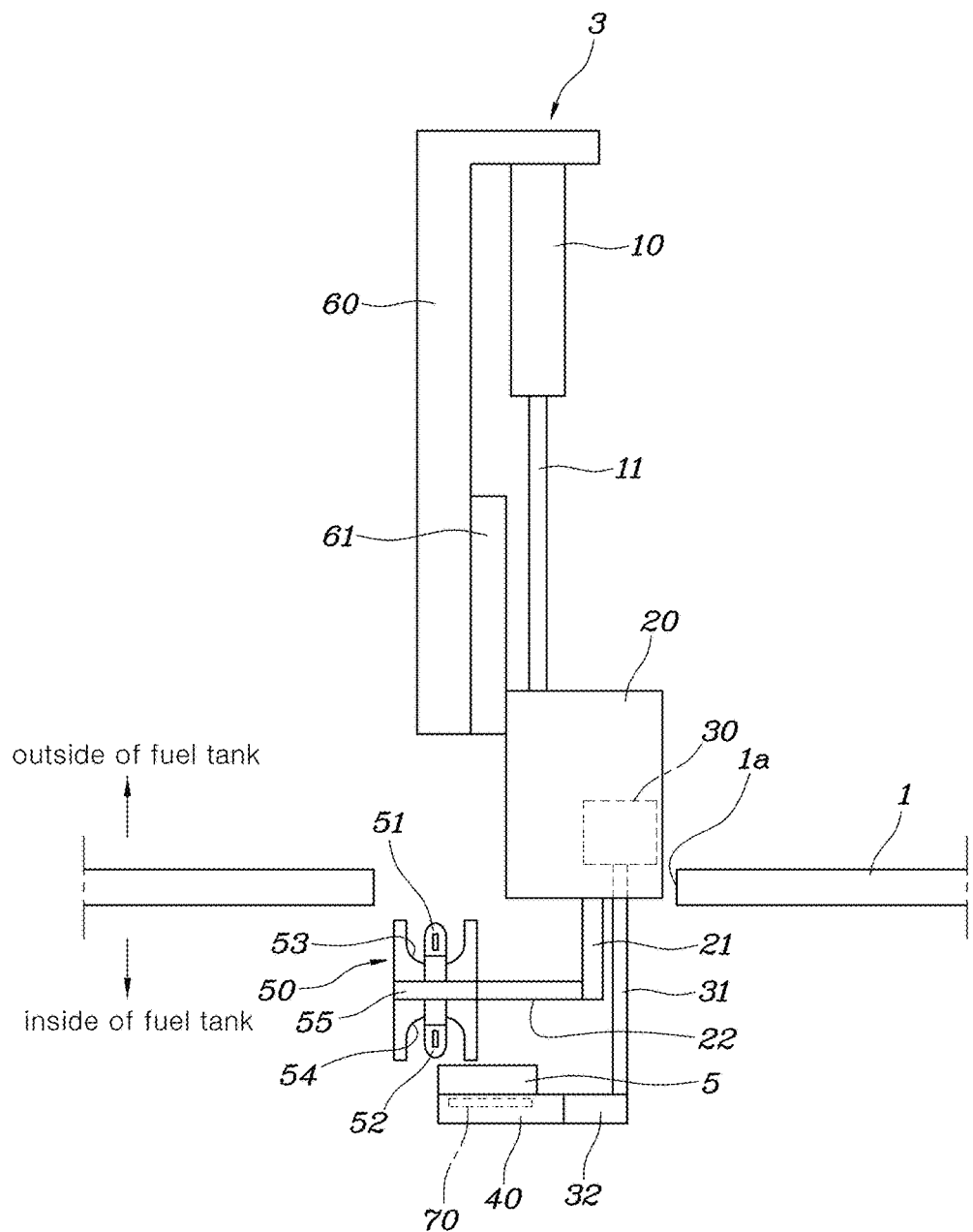

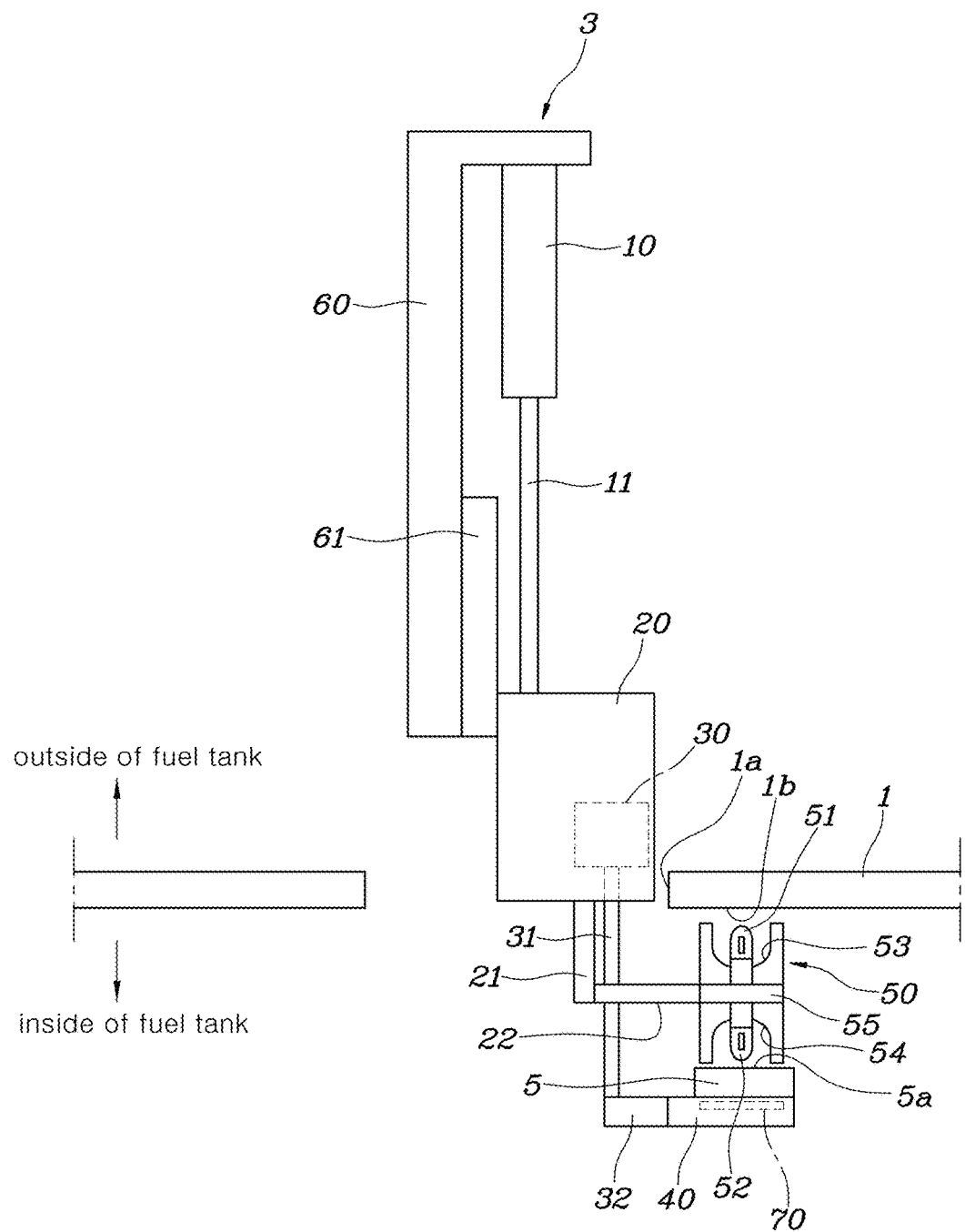
[FIG. 5]

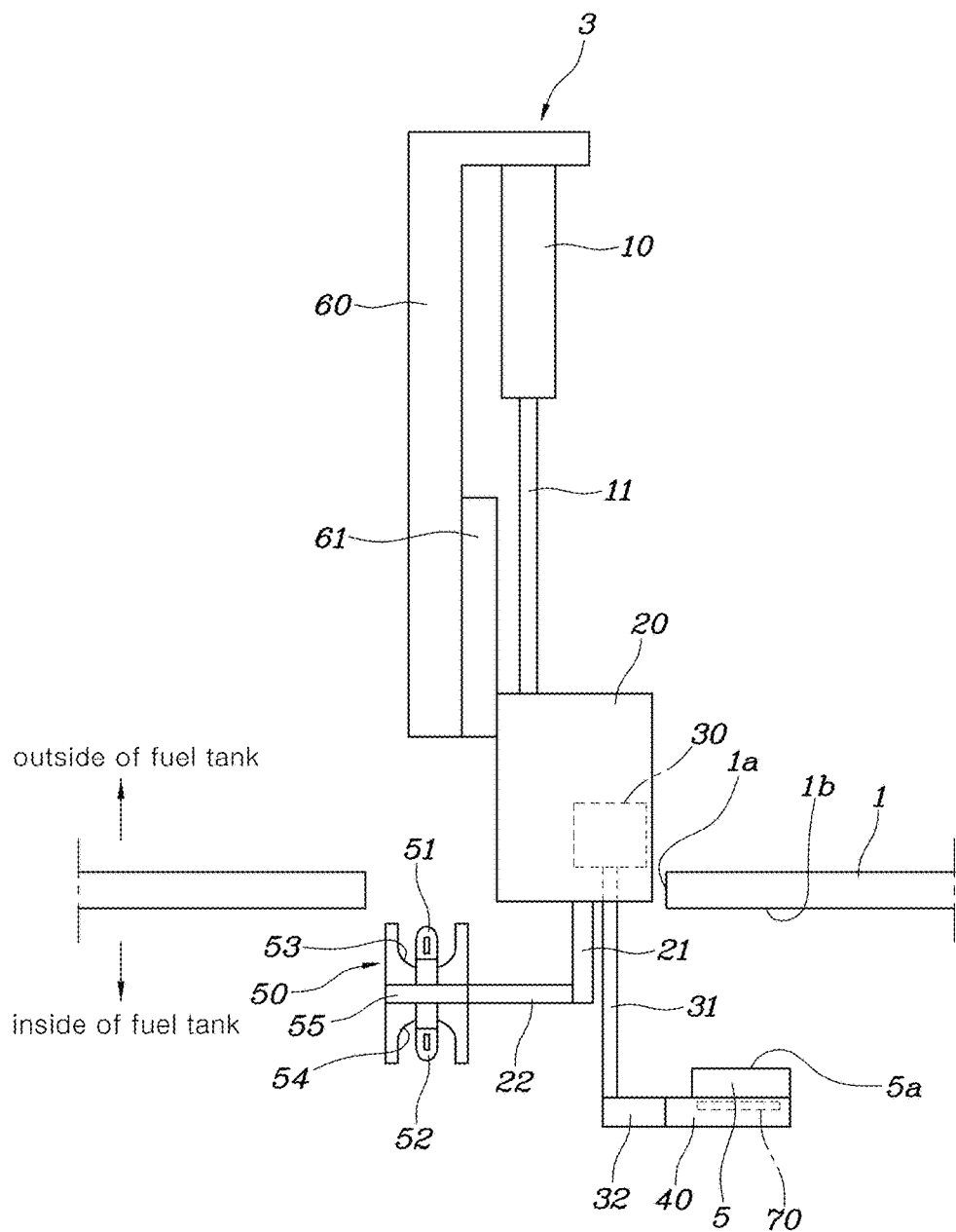
[FIG. 6]

[FIG. 7]
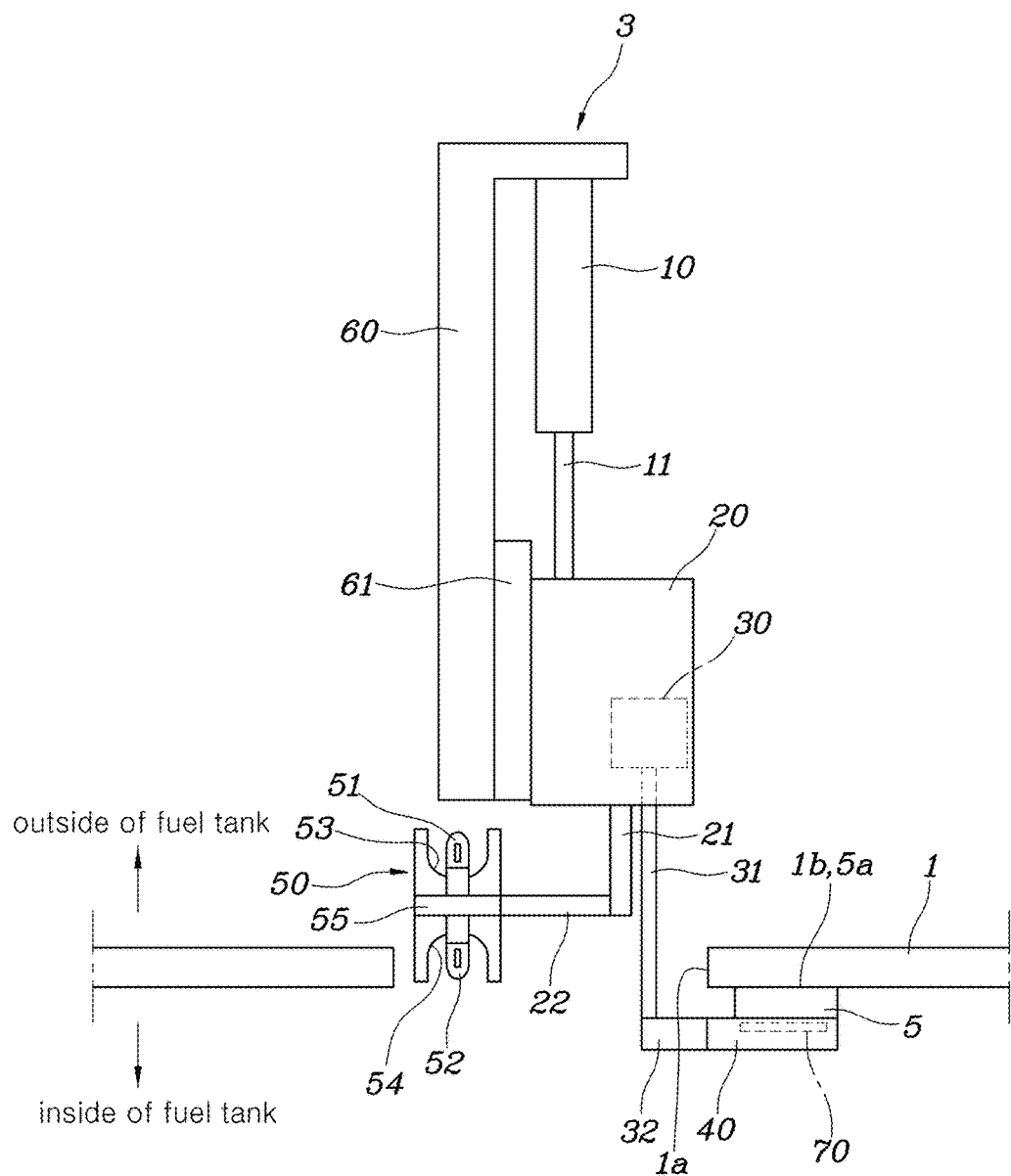

[FIG. 8]
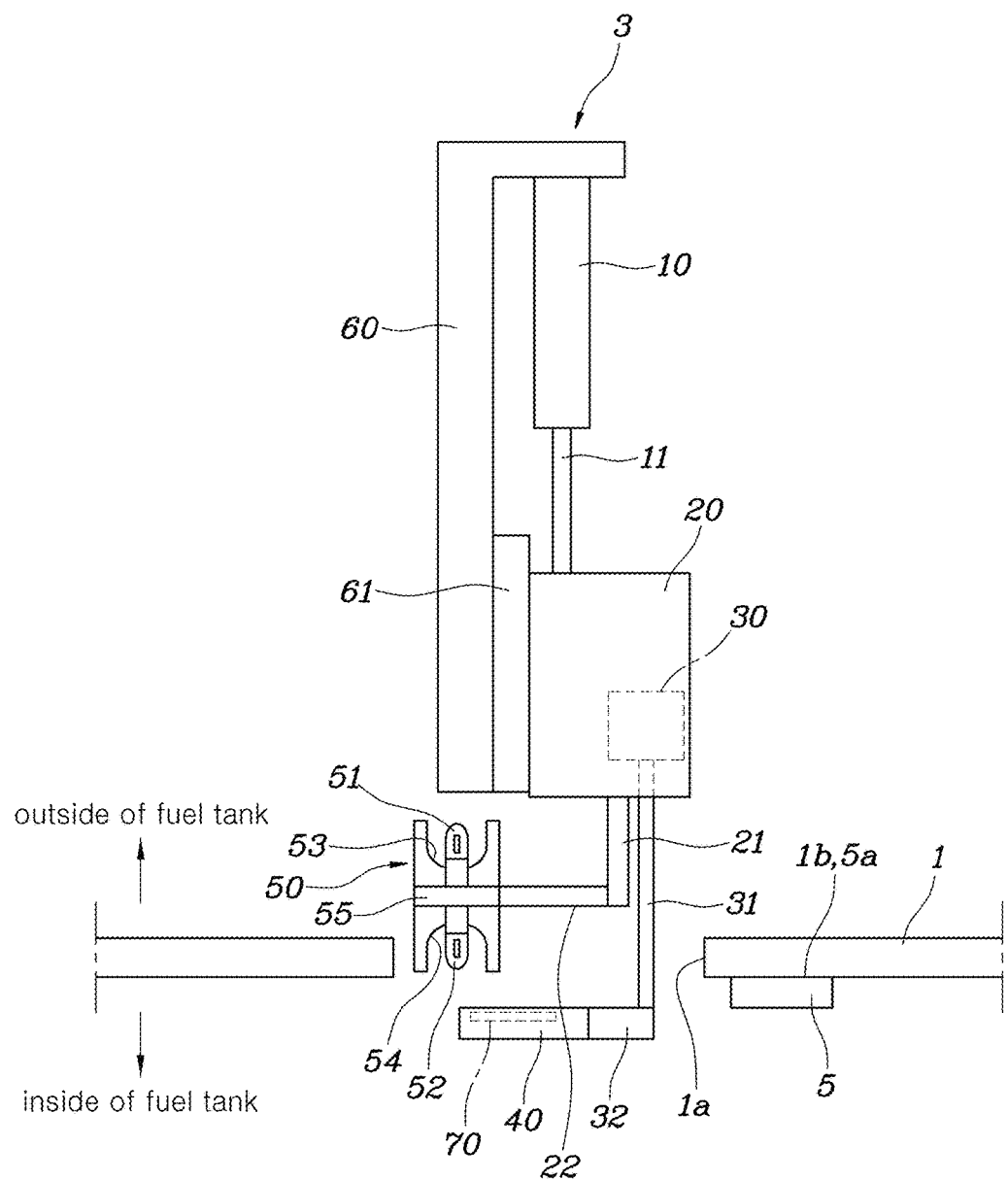

[FIG. 9]
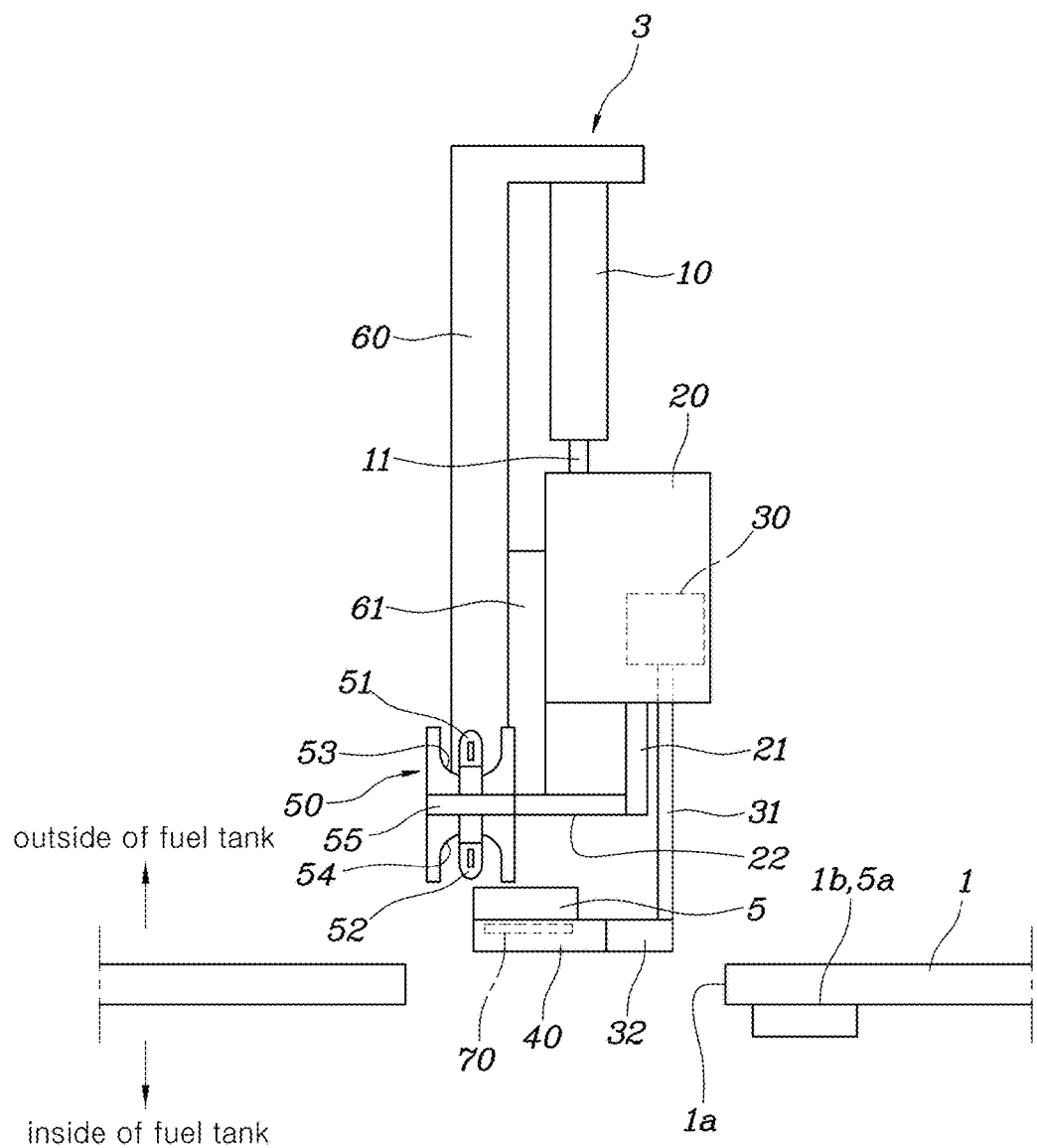

HEAT WELDING APPARATUS FOR COMBINING PLASTIC FUEL TANK AND PLASTIC PARTS AND METHOD OF COMBINING PLASTIC FUEL TANK AND PLASTIC PARTS USING THE APPARATUS

CROSS REFERENCE TO RELATED APPLICATION

The present application claims priority to Korean Patent Application No. 10-2017-0090138, filed Jul. 17, 2017, the entire contents of which is incorporated herein for all purposes by this reference.

BACKGROUND

Technical Field

The present disclosure relates to a heat welding apparatus for combining a plastic fuel tank and plastic parts and a method of combining the plastic fuel tank and the plastic parts using the apparatus.

Description of Related Art

In general, an engine of a vehicle is a device that converts thermal energy into mechanical rotational force by rotating a crankshaft using an explosive force generated by burning fuel in a combustion chamber.

In such an engine, fuel to be burned in the combustion chamber is continuously supplied thereto, and a fuel tank storing a certain amount of fuel is provided in the vehicle for continuous supply of the fuel.

The disclosure of this section is to provide background of the invention. Applicant notes that this section may contain information available before this application. However, by providing this section, Applicant does not admit that any information contained in this section constitutes prior art.

SUMMARY

One aspect of the present invention provides a heat welding apparatus for combining a plastic fuel tank and plastic parts and a method of combining the plastic fuel tank and the plastic parts using the apparatus, wherein when a plastic part is heat-welded onto an inner surface of the plastic fuel tank, a welding portion of the inner surface of the plastic fuel tank, to which the plastic part is joined, and a welding surface of the plastic part are simultaneously heated and melted inside the plastic fuel tank, and then are heat-welded together after melting without delay. Consequently, the time from when heating of the welding portion of the plastic fuel tank and heating of the plastic part are performed to when heat welding thereof begins is significantly reduced, whereby the welding portion and the plastic part are ideally heated for welding, thereby minimizing the occurrence rate of joining defects at the time of heat welding.

According to an embodiment of the present invention, there is provided a heat welding apparatus for combining a plastic fuel tank and plastic parts, the apparatus joining a plastic part onto an inner surface of the plastic fuel tank by heat welding, the apparatus including: a cylinder having a cylinder rod moving linearly; a first rotary actuator coupled with the cylinder rod and having a first shaft being rotatable and a first rotary shaft coupled with the first shaft; a second rotary actuator coupled with the first rotary actuator and having a second shaft being rotatable, and a second rotary shaft coupled with the second shaft; a gripper coupled with the second rotary shaft and clamping and fixing the plastic part; and a melting unit coupled with the first rotary shaft and configured to simultaneously heat a welding portion of the plastic fuel tank, to which the plastic part is joined, and a welding surface of the plastic part.

The cylinder may be coupled to a body frame coupled with a robot arm, a guide may be coupled to the body frame, and the guide may be connected to the first rotary actuator and guides rectilinear movement of the first rotary actuator.

An operation of fixing the plastic part to the gripper may be performed at a position outside the plastic fuel tank, and an operation of simultaneously heating the welding portion of the plastic fuel tank and the welding surface of the plastic part using the melting unit may be performed at a position inside the plastic fuel tank.

When the cylinder rod moves rectilinearly, the first and second rotary actuators, the gripper, and the melting unit may be inserted into or withdrawn out of the plastic fuel tank through a tank hole formed at the plastic fuel tank.

The apparatus may further include: a load cell measuring a joining force relative to heat welding when the welding surface of the plastic part contacts with and is heat-welded to the welding portion of the plastic fuel tank after the welding portion of the plastic fuel tank and the welding surface of the plastic part are simultaneously heated and melted by the melting unit.

The melting unit may include: first and second lamps generating infrared rays to simultaneously heat the welding portion of the plastic fuel tank and the welding surface of the plastic part when power is applied; and first and second reflectors condensing the infrared rays generated from the first and second lamps on the welding portion of the plastic fuel tank and the welding surface of the plastic part, respectively.

The first and second lamps may be arranged such that the infrared rays emitted from the first and second lamps are irradiated in directions opposite to each other; and a heat insulating material may be provided between the first and second lamps.

At the position inside the plastic fuel tank, the melting unit may be located at a position between the welding portion of the plastic fuel tank and the welding surface of the plastic part and simultaneously heat the welding portion and the welding surface; when the simultaneous heating of the welding portion and the welding surface is completed, the melting unit may move to a position away from the position between the welding portion and the welding surface by operation of the first rotary actuator; and when the cylinder rod moves rectilinearly to be shortened in length after the melting unit moves, the welding surface may contact with the welding portion so that the plastic part is heat-welded onto the inner surface of the plastic fuel tank.

A method of combining a plastic fuel tank and plastic part, the method joining a plastic part onto an inner surface of the plastic fuel tank by heat welding using the heat welding apparatus of claim 1, the method including: fixing the plastic part to the gripper at a position outside the plastic fuel tank; moving the plastic part fixed to the gripper and the melting unit to a position inside the plastic fuel tank; simultaneously heating the welding portion of the plastic fuel tank and the welding surface of the plastic part using the melting unit at the position inside the plastic fuel tank; and when the heating of the welding portion and the welding surface is completed, joining the plastic part onto the inner surface of the plastic fuel tank by heat welding while contacting the welding surface with the welding portion.

When the plastic part is heat-welded onto the inner surface of the plastic fuel tank, the gripper and the melting unit may be drawn out of the plastic fuel tank.

The gripper and the melting unit may be moved to positions inside and outside the plastic fuel tank through a tank hole formed in the plastic fuel tank.

According to the embodiment of the present invention as described above, when the plastic part is heat-welded onto the inner surface of the plastic fuel tank, the melting unit simultaneously heats and melts the welding portion of the inner surface of the plastic fuel tank, to which the plastic part is joined, and the welding surface of the plastic part inside the plastic fuel tank, and then the welding surface of the plastic part is heat-welded to the welding portion of the plastic fuel tank without delay after melting. Thus, it is possible to significantly reduce the time from when heating of the welding portion of the plastic fuel tank and heating of the plastic part are performed to when heat welding thereof begins, whereby the welding portion and the plastic part are ideally heated for welding, thereby significantly improving the joining force at the time of heat welding. Consequently, it is possible to eliminate defects of the manufactured plastic fuel tank.

BRIEF DESCRIPTION OF THE DRAWINGS

The above and other objects, features and other advantages of the present invention will be more clearly understood from the following detailed description when taken in conjunction with the accompanying drawings, in which:

FIGS. 1 to 9 are views showing an operation process of a heat welding apparatus according to an embodiment of the present invention and a method of heat-welding.

DETAILED DESCRIPTION OF EMBODIMENTS

Hereinbelow, a heat welding apparatus for combining a plastic fuel tank and plastic parts and a method of combining the plastic fuel tank and the plastic parts using the apparatus according to embodiments of the present invention will be described in detail with reference to the accompanying drawings. Throughout the drawings, the same reference numerals will refer to the same or like parts.

A fuel tank is usually made of steel or plastic. In recent years, however, a plastic fuel tank has been increasingly used for weight reduction and fuel mileage improvement.

The plastic fuel tank is generally manufactured through a melting process, an extrusion process, and a blowing process. The melting process is a process of melting a plastic material by applying high temperature heat to obtain a molten resin. The extrusion process is a process of extruding the molten resin into a C-shaped parison, a twin-sheet parison, a cylinder-shaped parison, etc. The blowing process is a process of placing a parison into a mold and blowing high-pressure air into the parison to form the parison in a shape of the fuel tank.

The plastic fuel tank manufactured through the blow molding process is subjected to a cooling process and then various plastic parts such as a valve are joined to the fuel tank by heat welding, and some plastic parts are joined onto the inner surface of the plastic fuel tank.

Typically, when a plastic part is heat-welded onto the inner surface of the plastic fuel tank as described above, a welding portion of the plastic fuel tank and the plastic part are heated and melted individually at different time intervals. Further, the plastic part is heated and melted at a position outside the plastic fuel tank, and then is moved to the inside of the plastic fuel tank and heat-welded to the welding portion of the plastic fuel tank. Accordingly, the time from when heating of the welding portion of the plastic fuel tank and heating of the plastic part are performed to when heat welding thereof begins is excessively long. As a result, the heat welding proceeds in a state in which solidification has begun, whereby the occurrence rate of joining defects may increase.

A parison made of a plastic resin is placed in a mold and is blow-molded to manufacture a plastic fuel tank having a certain shape, and as shown in FIG. 1, a tank hole 1a having a predetermined size is formed at a predetermined portion of the manufactured plastic fuel tank 1 that has been subjected to a cooling process, the tank hole being formed for mounting a fuel pump.

The plastic fuel tank 1 having the tank hole 1a is fixed to a jig 2 provided for a heat welding process, and a heat welding apparatus 3 according to the embodiment of the present invention is coupled with a robot arm 4 such that the heat welding apparatus 3 is moved toward the plastic fuel tank 1 fixed to the jig 2 by operation of the robot arm 4.

As shown in FIGS. 1 to 9, the heat welding apparatus 3 for combining the plastic fuel tank and the plastic parts according to the embodiment of the present invention includes: a cylinder 10 having a cylinder rod 11 moving rectilinearly; a first rotary actuator 20 coupled with the cylinder rod 11 and having a first shaft 21 being rotatable and a first rotary shaft 22 coupled with the first shaft 21; a second rotary actuator 30 coupled with the first rotary actuator 20 and having a second shaft 31 being rotatable and a second rotary shaft 32 coupled with the second shaft 31; a gripper 40 coupled with the second rotary shaft 32 and clamping and securing the plastic part 5; and a melting unit 50 coupled with the first rotary shaft 22 and configured to simultaneously heat a welding portion 1b of the plastic fuel tank 1, to which the plastic part 5 is joined, and a welding surface 5a of the plastic part 5.

The cylinder 10 is coupled to a body frame 60 coupled with the robot arm 4, a guide 61 is coupled to the body frame 60, and a first rotary actuator 20 is coupled to the guide 61. The guide 61 serves to guide rectilinear movement of the first rotary actuator 20 in addition to providing a stable engagement structure of the first rotary actuator 20.

The guide 61 is coupled with the first rotary actuator 20 in a male and female coupling structure. For example, when a rail groove extending in the vertical direction is formed on the guide 61 in the state of FIG. 2, a rail protrusion extending in the vertical direction and inserted into the rail groove may be formed on the first rotary actuator 20.

The plastic part 5 may include a clamping mechanism fixing a hose or the like, a valve mechanism, etc.

The cylinder 10, the first and second rotary actuators 20 and 30, and the gripper 40 may be a pneumatic, hydraulic, or electric type.

When the cylinder 10 operates, the cylinder rod 11 moves downward in the state of FIG. 2 or upward in the state of FIG. 4.

The first rotary actuator 20 moves rectilinearly vertically while being guided by the guide 61 when the cylinder rod 11 moves rectilinearly, and the second rotary actuator 30 coupled with the first rotary actuator 20 moves together with the first rotary actuator 20.

Referring to FIG. 2, the second rotary actuator 30 is located behind the first rotary actuator 20, but is not limited thereto. The second rotary actuator 30 may be directly coupled with the first rotary actuator 20 at various positions, or indirectly connected therewith using a bracket, etc.

When the first rotary actuator 20 operates, the first shaft 21 is rotated clockwise or counterclockwise by receiving power, and by rotation of the first shaft 21, the first rotary shaft 22 is rotated to the right in the state of FIG. 2, or to the left in the state of FIG. 5. In other words, the first rotary shaft 22 is rotatable 180 degrees.

When the first rotary shaft 22 is rotated to the right from the state of FIG. 2 to the state of FIG. 5, the first rotary shaft 22 does not interfere with the second shaft 31.

When the second rotary actuator 30 operates, the second shaft 31 is rotated clockwise or counterclockwise by receiving power, and by rotation of the second shaft 31, the second rotary shaft 32 is rotated to the right in the state of FIG. 2 or to the left in the state of FIG. 5. In other words, the second rotary shaft 32 is rotatable 180 degrees.

The gripper 40 is coupled to the end of the second rotary shaft 32, and as shown in FIGS. 2 and 5, the gripper 40 is positioned below the melting unit 50. To this end, at least one of the second shaft 31 and the second rotary shaft 32 may be curved to have a predetermined angle or curvature. Of course, herein, the second shaft 31 does not interfere with the first rotary shaft 22 when the first rotary shaft 22 is rotated.

In the case of using the apparatus according to the embodiment of the present invention, the operation of fixing the plastic part 5 to the gripper 40 is performed at a position outside the plastic fuel tank 1 as shown in FIG. 2, the operation of simultaneously heating the welding portion 1b of the plastic fuel tank 1 and the welding surface 5a of the plastic part 5 using the melting unit 50 is performed at a position inside the plastic fuel tank 1 as shown in FIG. 5.

The apparatus according to the embodiment of the present invention operates such that when the cylinder rod 11 moves rectilinearly, the first and second rotary actuators 20 and 30, the gripper 40, and the melting unit 50 are inserted into or withdrawn out of the plastic fuel tank 1 through the tank hole 1a formed at the plastic fuel tank 1.

The apparatus according to the embodiment of the present invention further includes a load cell 70 measuring a joining force relative to heat welding when the welding surface 5a of the plastic part 5 contacts with and is heat-welded to the welding portion 1b of the plastic fuel tank 1 after the welding portion 1b of the plastic fuel tank 1 and the welding surface 5a of the plastic part 5 are simultaneously heated and melted by the melting unit 50.

When the welding surface 5a of the plastic part 5 is joined to the welding portion 1b of the plastic fuel tank 1 by heat welding using the apparatus according to the embodiment of the present invention, there is a possibility in that if the joining force is too strong, the shape of the plastic fuel tank 1 or the plastic part 5 may be distorted, and if the joining force is too weak, the joining defects of the plastic part 5 may occur. In order to prevent this, the load cell 70 is provided to measure the joining force relative to heat welding of the plastic part 5 whereby the plastic part 5 is joined to the plastic fuel tank 1 by optimum joining force, thereby further improving quality of the plastic fuel tank 1.

Although the load cell 70 is provided at the gripper 40 as an example, the load cell 70 may be provided at various positions such as the cylinder 10 as long as it can measure the joining force relative to heat welding of the plastic part 5.

The melting unit 50 includes first and second lamps 51 and 52 generating infrared rays to simultaneously heat the welding portion 1b of the plastic fuel tank 1 and the welding surface 5a of the plastic part 5 when power is applied, and first and second reflectors 53 and 54 condensing the infrared rays generated from the first and second lamps 51 and 52 on the welding portion 1b of the plastic fuel tank 1 and the welding surface 5a of the plastic part 5, respectively.

The first and second reflectors 53 and 54 serve to reflect light scattered backward from the first and second lamps 51 and 52, and may be a mirror without being limited thereto.

The melting unit 50 according to the embodiment of the present invention is configured to simultaneously heat the welding portion 1b of the plastic fuel tank 1 and the welding surface 5a of the plastic part 5 using the first and second lamps 51 and 52. To this end, the first and second lamps 51 and 52 are structured such that the infrared rays emitted from the first and second lamps 51 and 52 are irradiated in directions opposite to each other, that is, the first and second lamps 51 and 52 are arranged at vertical positions to oppositely face in directions angularly spaced out at 180 degree angles.

Further, a heat insulating material 55 is provided between the first and second lamps 51 and 52 so that heat generated from the first lamp 51 is prevented from being transmitted to the second lamp 52 while heat generated from the second lamp 52 is prevented from being transmitted to the first lamp 51. Accordingly, the first and second lamps 51 and 52 are prevented from overheating, thereby extending the lifetime of the first and second lamps 51 and 52.

Further, the method of joining the plastic part 5 onto the inner surface of the plastic fuel tank 1 by heat welding using the heat welding apparatus 3 according to the embodiment of the present invention includes: fixing the plastic part 5 to the gripper 40 at a position outside the plastic fuel tank 1; moving the plastic part 5 fixed to the gripper 40 and the melting unit 50 to a position inside the plastic fuel tank 1; simultaneously heating the welding portion 1b of the plastic fuel tank 1 and the welding surface 5a of the plastic part 5 using the melting unit 50 at a position inside the plastic fuel tank 1; and when the heating of the welding portion 1b and the welding surface 5a is completed, joining the plastic part 5 onto the inner surface of the plastic fuel tank 1 by heat welding while contacting the welding surface 5a with the welding portion 1b.

The gripper 40 and the melting unit 50 are drawn out of the plastic fuel tank 1 after the plastic part 5 is heat-welded onto the inner surface of the plastic fuel tank 1. Here, the gripper 40 and the melting unit 50 are moved to positions inside and outside the plastic fuel tank 1 through the tank hole 1a formed at the plastic fuel tank 1.

Hereinafter, the operation of the embodiment of the present invention will be described.

The parison made of the plastic resin is placed in the mold and blow-molded to manufacture the plastic fuel tank 1 having a certain shape. Then, the plastic fuel tank 1 is subjected to the cooling process, and as shown in FIG. 1, the tank hole 1a having a predetermined size is formed at a predetermined portion of the plastic fuel tank 1, the tank hole 1a being formed for mounting the fuel pump.

The plastic fuel tank 1 having the tank hole 1a is fixed to the jig 2 provided for the heat welding process. The heat welding apparatus 3 is coupled with the robot arm 4 and is moved toward the tank hole 1a of the plastic fuel tank 1 fixed to the jig 2 by operation of the robot arm 4 as shown in FIG. 2, and fixes the plastic part 5 that will be heat-welded to the plastic fuel tank 1 using the gripper 40 as shown in FIG. 3.

When the plastic part 5 is fixed using the gripper 40, as shown in FIG. 4, the cylinder rod 11 moves downward by operation of the cylinder 10, and the first rotary actuator 20 moves downward while being guided by the guide 61, and the second rotary actuator 30 coupled with the first rotary actuator 20 also moves downward. Here, the plastic part 5 fixed to the gripper 40 and the melting unit 50 are inserted into the plastic fuel tank 1 through the tank hole 1a formed at the plastic fuel tank 1.

When the plastic part 5 fixed to the gripper 40 and the melting unit 50 are inserted into the plastic fuel tank 1, the first rotary actuator 20 operates whereby the first shaft 21 is rotated by receiving power, and the first rotary shaft 22 and the melting unit 50 are rotated 180 degrees to the right as shown in FIG. 5. Further, the second rotary actuator 30 operates whereby the second shaft 31 is rotated, and the second rotary shaft 32, the gripper 40, and the plastic part 5 fixed to the gripper 40 are rotated 180 degrees to the right.

The first rotary shaft 22 is rotated without interfering with the second shaft 31, so that smooth rotation of the first rotary shaft 22 is ensured.

When rotation of the first and second rotary shafts 22 and 32 is completed as shown in FIG. 5, the first lamp 51 of the melting unit 50 faces the welding portion 1b of the inner surface of the plastic fuel tank 1, and the second lamp 52 faces the welding surface 5a of the plastic part 5. Thereafter, when power is applied to the melting unit 50, infrared rays are generated from the first and second lamps 51 and 52 whereby the welding portion 1b and the welding surface 5a are heated and melted.

When the welding portion 1b and the welding surface 5a are melted sufficiently, the first and second lamps 51 and 52 are turned off, and then the first rotary actuator 20 is operated so that as shown in FIG. 6, the first rotary shaft 22 and the melting unit 50 are rotated 180 degrees to the left. Thus, the melting unit 50 is moved to another position in a state where it is positioned between the welding portion 1b of the plastic fuel tank 1 and the welding surface 5a of the plastic part 5.

When movement of the melting unit 50 is completed as shown in FIG. 6, the cylinder rod 11 moves upward by operation of the cylinder 10 as shown in FIG. 7, the first and second rotary actuators 20 and 30 also move upward by upward movement of the cylinder rod 11. In this process, the welding surface 5a of the plastic part 5 fixed to the gripper 40 contacts with and joined to the welding portion 1b of the plastic fuel tank 1 by heat welding.

The joining force at the time of heat welding is measured by the load cell 70 and the measured value is transmitted to a controller. The controller controls operation of the cylinder 10, that is, the upward movement of the cylinder rod 11, using the measured value of the load cell 70, thereby ensuring optimal joining force at the time of heat welding.

When heat welding of the plastic part 5 to the welding portion 1b of the plastic fuel tank 1 is completed as shown in FIG. 7, the gripper 40 is removed to release the plastic part 50 from the fixed state, and by operation of the second rotary actuator 30, the second rotary shaft 32 and the gripper 40 are rotated 180 degrees to the left as shown in FIG. 8, and positioned coaxially with the tank hole 1a.

When the cylinder rod 11 moved upward by operation of the cylinder 10 in the state of FIG. 8, the gripper 40 and the melting unit 50 are finally drawn out of the plastic fuel tank 1 through the tank hole 1a of the plastic fuel tank 1 to be returned to their original positions as shown in FIG. 9, thereby preparing the following process.

According to the embodiment of the present invention as described above, when the plastic part 5 is heat-welded onto the inner surface of the plastic fuel tank 1, the melting unit 50 simultaneously heats and melts the welding portion 1b of the inner surface of the plastic fuel tank 1, to which the plastic part 5 is joined, and the welding surface 5a of the plastic part 5 at a position inside the plastic fuel tank 1, and then the welding surface 5a of the plastic part 5 is heat-welded to the welding portion 1b of the plastic fuel tank 1 without delay after melting. Thus, it is possible to significantly reduce the time from when heating of the welding portion 1b of the plastic fuel tank 1 and heating of the plastic part 5 are performed to when heat welding thereof begins, whereby the welding portion 1b and the plastic part 5 are ideally heated for welding, thereby significantly improving the joining force at the time of heat welding. Consequently, it is possible to eliminate defects of the manufactured plastic fuel tank 1.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A heat welding apparatus for combining a plastic fuel tank and plastic parts, the apparatus joining a plastic part onto an inner surface of the plastic fuel tank by heat welding, the apparatus comprising:
    a cylinder having a cylinder rod moving rectilinearly;
    a first rotary actuator coupled with the cylinder rod and having a first shaft being rotatable and a first rotary shaft coupled with the first shaft;
    a second rotary actuator coupled with the first rotary actuator and having a second shaft being rotatable and a second rotary shaft coupled with the second shaft;
    a gripper coupled with the second rotary shaft and clamping and fixing the plastic part; and
    a melting unit coupled with the first rotary shaft and configured to simultaneously heat a welding portion of the plastic fuel tank, to which the plastic part is joined, and a welding surface of the plastic part.

2. The apparatus of claim 1, wherein an operation of fixing the plastic part to the gripper is performed at a position outside the plastic fuel tank; and
    an operation of simultaneously heating the welding portion of the plastic fuel tank and the welding surface of the plastic part using the melting unit is performed at a position inside the plastic fuel tank.

3. The apparatus of claim 2, wherein at the position inside the plastic fuel tank, the melting unit is located at a position between the welding portion of the plastic fuel tank and the welding surface of the plastic part and simultaneously heats the welding portion and the welding surface;
    when the simultaneous heating of the welding portion and the welding surface is completed, the melting unit moves to a position away from the position between the welding portion and the welding surface by operation of the first rotary actuator; and
    when the cylinder rod moves rectilinearly to be shortened in length after the melting unit moves, the welding surface contacts with the welding portion so that the plastic part is heat-welded onto the inner surface of the plastic fuel tank.

4. The apparatus of claim 1, wherein the melting unit includes:
    first and second lamps generating infrared rays to simultaneously heat the welding portion of the plastic fuel tank and the welding surface of the plastic part when power is applied; and
    first and second reflectors condensing the infrared rays generated from the first and second lamps on the welding portion of the plastic fuel tank and the welding surface of the plastic part, respectively.

5. The apparatus of claim 4, wherein the first and second lamps are arranged such that the infrared rays emitted from the first and second lamps are irradiated in directions opposite to each other; and a heat insulating material is provided between the first and second lamps.

6. The apparatus of claim 1, wherein the cylinder is coupled to a body frame coupled with a robot arm;

a guide is coupled to the body frame; and the guide is connected to the first rotary actuator and guides rectilinear movement of the first rotary actuator.

7. The apparatus of claim 1, wherein when the cylinder rod moves rectilinearly, the first and second rotary actuators, the gripper, and the melting unit are inserted into or withdrawn out of the plastic fuel tank through a tank hole formed at the plastic fuel tank.

8. The apparatus of claim 1, further comprising:

a load cell measuring a joining force relative to heat welding when the welding surface of the plastic part contacts with and is heat-welded to the welding portion of the plastic fuel tank after the welding portion of the plastic fuel tank and the welding surface of the plastic part are simultaneously heated and melted by the melting unit.

9. A method of combining a plastic fuel tank and plastic part, the method joining a plastic part onto an inner surface of the plastic fuel tank by heat welding using the heat welding apparatus of claim 1, the method comprising:

fixing the plastic part to the gripper at a position outside the plastic fuel tank;

moving the plastic part fixed to the gripper and the melting unit to a position inside the plastic fuel tank;

simultaneously heating the welding portion of the plastic fuel tank and the welding surface of the plastic part using the melting unit at the position inside the plastic fuel tank; and when the heating of the welding portion and the welding surface is completed, joining the plastic part onto the inner surface of the plastic fuel tank by heat welding while contacting the welding surface with the welding portion.

10. The method of claim 9, wherein when the plastic part is heat-welded onto the inner surface of the plastic fuel tank, the gripper and the melting unit are drawn out of the plastic fuel tank.

11. The method of claim 10, wherein the gripper and the melting unit are moved to positions inside and outside the plastic fuel tank through a tank hole formed at the plastic fuel tank.

* * * * *